Patented Sept. 1, 1931

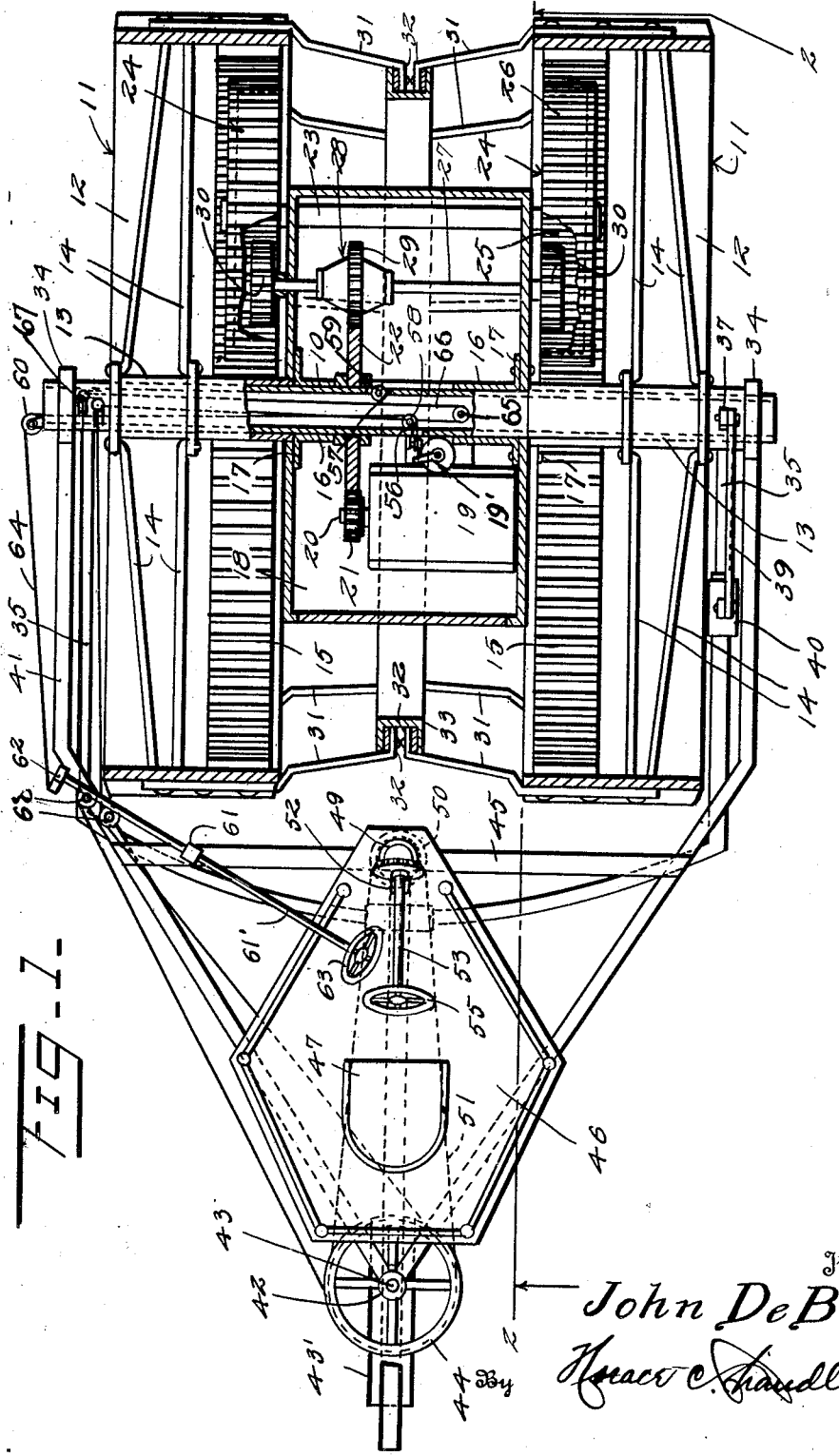

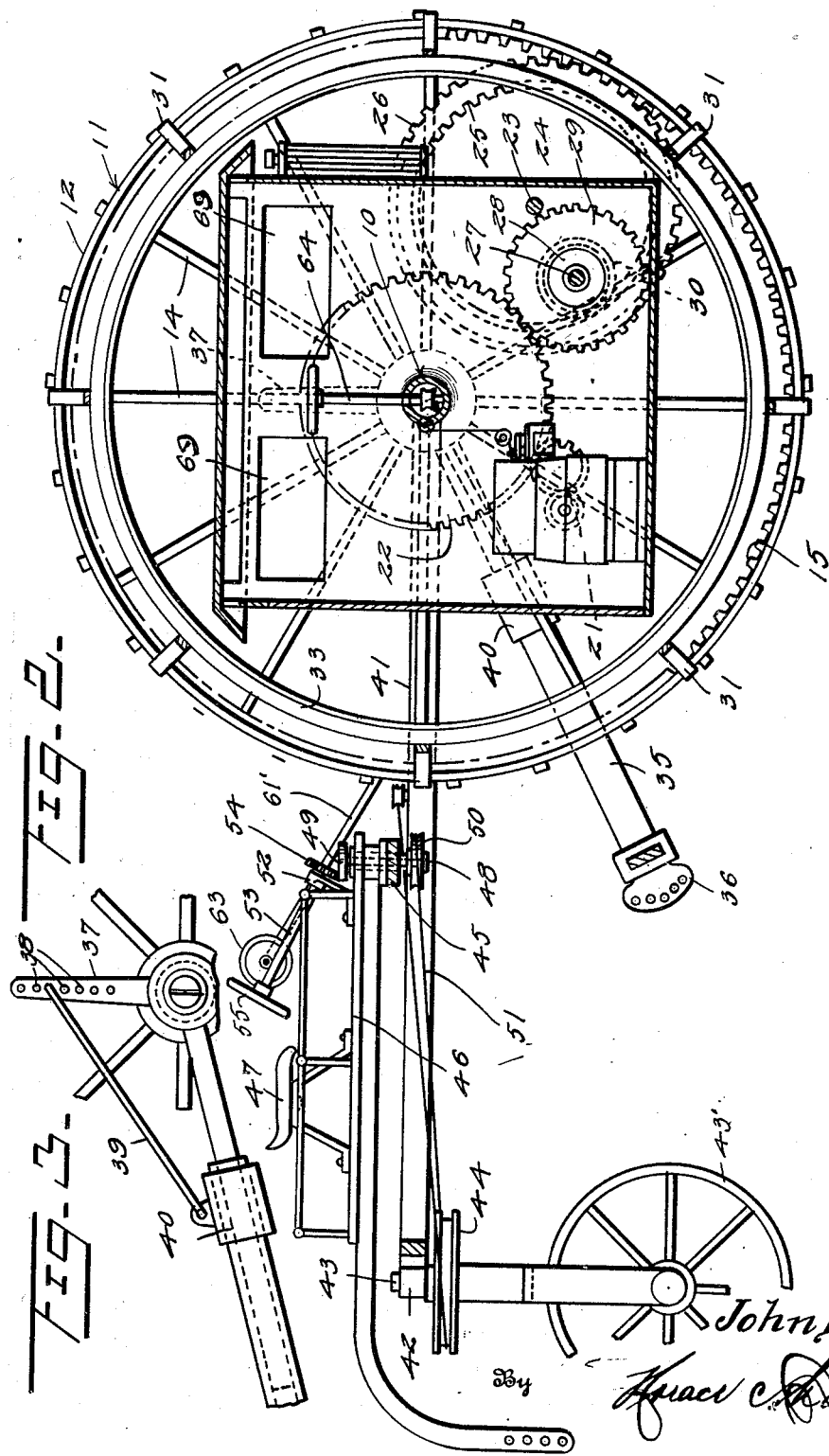

1,821,007

UNITED STATES PATENT OFFICE

JOHN DE BOER, OF CORSICA, SOUTH DAKOTA

TRACTOR

Application filed July 24, 1929. Serial No. 380,671.

This invention relates to new and useful improvements in tractors, and particularly to tractors which are especially adapted for farm use.

One object of the invention is to provide a tractor which is simple in construction, and which will be easy and efficient in operation.

Another object is to provide a tractor wherein the operator may be protected from the weather, and also from flying dust.

Another object is to provide a device of this character which will readily pull various farm implements, and which may be easily controlled.

Other objects and advantages will be apparent from the following description when taken in connection with the accompanying drawings.

In the drawings:

Figure 1 is a top plan view of a tractor made in accordance with the present invention, partly in section.

Figure 2 is a vertical sectional view on the line 2—2 of Figure 1.

Figure 3 is a detail view showing the adjusting means for the draft yoke.

Referring particularly to the accompanying drawings, 10 represents the hollow main axle of the tractor, on the ends of which are mounted the ground or traction wheels 11. Each of these wheels has a wide tread portion 12, connected with the hub 13 by means of the spokes 14. A large portion of the tread of each of the wheels 11 extends inwardly beyond the hub and has secured to its inner face the toothed ring 15. On the axle 10, inwardly of the hubs 13, are the sleeves 16, which have the terminal flanges 17, secured to the inner faces of the side walls of the driver's cab 18, through which the said axle 10 passes, whereby the cab is pivotally suspended. In this cab is mounted the motor 19, the shaft 20 of which extends laterally where it is provided with a small gear 21, said gear meshing with a large gear 22, mounted on the axle 10. Disposed transversely through the forward portion of the cab 18 is a shaft 23, and mounted on each end of said shaft is a ring gear 24, having internal teeth 25 and external teeth 26, the latter meshing with the toothed ring 15, of a ground wheel 11. A second shaft 27 extends through the cab and is provided with the differential gearing indicated as a whole by the numeral 28, and which includes the gear 29, said gear meshing with the beforementioned gear 22, on the axle 10. On the ends of the shaft 27 are the gears 30 which mesh with the internal teeth 25 of the ring gear 24, and whereby the wheels 11 are driven.

Secured to the outer face of the tread of each of the wheels 11, and extending inwardly toward the other wheel, are the regularly spaced arms 31, each having its inner end bent at right angles, as at 32, to extend toward the center of the axle 10. Disposed centrally between the wheels, and independent of connection therewith, is a channeled ring 33, of slightly smaller diameter than the wheels, the channel of said ring being directed outwardly and receiving the angularly turned ends of the arms 31, whereby the said ring is maintained in its proper position between the wheels. This arrangement permits independent rotation of the wheels under the influence of the differential gearing 28, especially when the machine is making a turn, by reason of the fact that the inner ends of the arms 31 are adapted to slide within the groove of the said ring 33.

Loosely engaged on the ends of the axle 10 outwardly of the hubs of the wheels 11, are the eye portions 34 of the arms of the draft yoke 35, said yoke extending rearwardly and transversely of the wheels 11, where it is provided with a clevis 36 for attachment of various agricultural implements, which the machine is to pull, said clevis being loosely supported on the yoke for slidable movement from side to side of the machine. Mounted on the said ends of the axle are the vetrical arms 37, each of which is formed with a longitudinal series of openings 38, for receiving an end of a link 39, which is pivotally connected to a collar slidably adjustable on an arm of the yoke 35, as shown at 40, such construction permitting the vertical swinging adjustment of the yoke, to the required level, for the implement which is to be drawn by the tractor.

Engaged on the ends of the axle 10, outwardly of the arms of the yoke 35, are the arms of a second yoke 41, said yoke extending rearwardly of the wheels to a considerably greater extent than the yoke 35, and is provided with a vertical bearing eye 42 which receives the pintle 43 of the caster wheel 43'. Secured on the said pintle 43, below the bearing eye 42, is a grooved wheel 44, to which more particular reference will be made later hereinafter. Secured to the arms of the yoke 41, a short distance in rear of the wheels 11, is a bar 45, and mounted on said yoke, with its forward end secured to the intermediate portion of the bar, is a platform 46, provided with a seat 47, for the driver of the tractor. Journaled in the forward end of the platform 46 is a vertical shaft 48, and secured on the upper end of said shaft is a bevel gear 49, while a small grooved wheel 50 is fixed on the lower end thereof. Engaged around the grooved wheels 44 and 50 is a belt 51. Mounted in a suitable bracket 52, on the forward portion of the platform 46, is a steering post 53, which has a bevel gear on its lower end, shown at 54, which meshes with the bevel gear 49, and has on its upper end the steering wheel 55, within easy reach of the driver from his seat 47. Upon rotation of the steering wheel 55 the belt 51 will transmit motion from the shaft 48 to the pintle of the caster wheel, whereby the tractor will be steered. In the central portion of the hollow axle 10 there are formed the openings 56 and 57, and mounted in the axle, adjacent these openings, respectively, are the pulleys 58 and 59. Mounted in one end of the axle 10 is a grooved wheel 60. Carried by the bar 45 is a bearing 61, in which is supported the rod 61', said rod extending toward one side of the tractor, and having a radially extending arm 62 on its outer end, while a hand-wheel 63 is mounted on its inner end for operation by the driver. Connected with said radial arm 62 is a cable 64 which passes around the pulley 60, thence inwardly through the interior of the axle 10, around the pulley 58, to the throttle 19', of the engine 19, whereby the driver may control the engine from his seat at the rear of the tractor. Within the cab is mounted a steering rod 65, which has the cable ends 66 connected therewith, said cable passing around the pulley 59, longitudinally through the axle, and thence rearwardly around the caster carried wheel 44, the intermediate portions of the cable engaging around pulleys 68 mounted on the yoke 41, whereby the driver, who is seated within the cab, may readily steer the tractor. The cab is provided with the windows 69, which permit the driver to have a view of the outside, and properly control the tractor.

What is claimed is:

1. A tractor including an axle, ground wheels on the ends of the axle whereby said wheels are spaced apart, an exteriorly grooved ring of slightly smaller diameter than the wheels disposed therebetween and in parallel relation thereto, a series of arms carried by the rim of each wheel extending in the direction of said ring, and a ring carried by each set of arms slidably engaged in the groove of said ring whereby to maintain the wheels in spaced parallel relation.

2. A tractor including an axle, spaced ground wheels on the axle for independent and simultaneous rotation, means including a differential gearing for driving the wheels, a ring disposed centrally between and independently of said wheels, said ring having an exterior groove, and means on the wheels slidably engaged in the groove of said ring for holding said wheels in spaced parallel relation to each other.

3. A tractor including an axle, ground wheels on the axle, means for driving the wheels, an exteriorly grooved ring arranged centrally between and independently of said wheels and in parallel relation therewith, arms extending from the inner edge of the rim of each of said wheels, toward the other wheel, engaged slidably in the groove of said ring.

In testimony whereof, I affix signature.

JOHN DE BOER.